United States Patent [19]
Ueno et al.

[11] Patent Number: 5,369,636
[45] Date of Patent: Nov. 29, 1994

[54] MULTIPLE COMMUNICATION SPEED CONVERTING APPARATUS

[75] Inventors: Chikako Ueno; Takashi Kakiwaki, both of Tokyo, Japan

[73] Assignee: NEC Corporation, Tokyo, Japan

[21] Appl. No.: 976,398

[22] Filed: Nov. 13, 1992

[30] Foreign Application Priority Data

Nov. 15, 1991 [JP]  Japan ................................. 3-300501

[51] Int. Cl.⁵ ............................................. H04J 3/22
[52] U.S. Cl. ................................................... 370/84
[58] Field of Search ............. 370/84, 79, 110.1, 100.1, 370/112, 60, 60.1, 79, 77

[56] References Cited

U.S. PATENT DOCUMENTS

| | | | |
|---|---|---|---|
| 3,794,768 | 2/1974 | Cichetti, Jr. et al. | 370/112 |
| 4,285,052 | 8/1981 | Bobbitt | 370/112 |
| 4,680,752 | 7/1987 | Takemura et al. | 370/68 |
| 4,970,719 | 11/1990 | Takase et al. | 370/84 |
| 5,001,711 | 3/1991 | Obana et al. | 370/102 |
| 5,124,976 | 6/1992 | Lemaistre et al. | 370/84 |
| 5,170,395 | 12/1992 | Shinmyo | 370/110.1 |
| 5,177,738 | 1/1993 | Dell'Oro et al. | 370/84 |

Primary Examiner—Douglas W. Olms
Assistant Examiner—Huy D. Vu
Attorney, Agent, or Firm—Foley & Lardner

[57] ABSTRACT

A time-sharing switch is connected to a speed adjuster conforming to the CCITT V.110. R reference point speed adjusters are linked with the switch. These components are controlled by a central controller so as to set a speed between the R reference point speed adjusters and the switch and a speed of the speed adjuster. A user speed is restricted to be less than the communication speed between the R reference point speed adjusters and the switch. This enables a plurality of non-ISDN terminals to conduct bi-directional communications therebetween. As a result, there is provided a multiple communication speed converting apparatus which allows a plurality of non-ISDN terminals of various speeds to communicate with the ISDN at 64 kbps in the synchronous and asynchronous modes according to the V.110 procedure of the CCITT recommendations.

7 Claims, 7 Drawing Sheets

MULTIPLE COMMUNICATION SPEED CONVERTING APPARATUS

BACKGROUND OF THE INVENTION

The present invention relates to a multiple communication speed converting apparatus, and in particular, to a multiple communication speed converting apparatus for implementing an R reference point multiplexing operation in the V.110 system according to the recommendations of the international telegraph and telephone consultative committee (CCITT).

DESCRIPTION OF THE RELATED ART

Heretofore, in operation of a communication speed converter realizing the R reference point multiplexing operation in the V.110 system of the CCITT recommendations, a plurality of non-ISDN terminals, i.e., terminals other than those of the integrated services digital network (ISDN) and a plurality of communication speed converters of the CCITT V.110 system connected to the non-ISDN terminals are linked with the ISDN network. Moreover, comparable non-ISDN terminals and communication speed converters conforming to the CCITT V.110 are coupled with the ISDN. Consequently, to achieve communications through a channel for the line exchange operation according to the CCITT V.110 procedure, only one non-ISDN terminal can be connected to one communication speed converter.

Since the transmission speed or rate adjustment of the conventional speed converter is accomplished according to bit mapping data, only one non-ISDN terminal can be connected to one channel for communications. Even when low-speed communication is to be conducted between the non-ISDN terminal and the transmission rate converter, the communication speed of 64 kilo-bits per second (kbps) inherent to the ISDN applies thereto and hence the density of mapping data is increased and unnecessary resources are excessively consumed.

SUMMARY OF THE INVENTION

It is therefore an object of the present invention to provide a communication speed converting apparatus capable of achieving multiplexing operations for terminals of various communication speeds in the synchronous and asynchronous modes at a communication speed not exceeding the communication speed between a time-sharing switch and the R reference point speed adjusting circuit, thereby removing the drawbacks of the prior art.

In accordance with the present invention, there is provided a multiple communication speed converting apparatus including speed adjusting means for achieving a speed adjustment in conformity with the V.110 of the CCITT recommendations. Time-sharing switching means is connected to the speed adjusting means for conducting a multiplexing operation in a time-sharing manner. Reference point speed adjusting means is connected to the time-sharing switching means and an R reference point interface stipulated according to the CCITT recommendations for supplying data to the switching means at a synchronizing speed. Also included is control means for setting a communication speed between the switching means and the R reference point speed adjusting means to a fixed speed not exceeding 32 kbps, the fixed speed being associated with a synchronous mode.

Namely, the speed converter according to the present invention includes a communication speed adjusting unit for achieving a communication speed adjustment in conformity with the V.110 of the CCITT recommendations. A time-sharing switching unit is connected to a plurality of serial-transmission lines for conducting a multiplexing operation in a time-sharing manner for connection to the communication speed adjusting unit. Also included are R reference point speed adjusting units for connecting the time-sharing switching unit to an R reference point interface for supplying data thereto at a synchronizing speed, and a central control unit for controlling operations of the units above. In the speed converter disposed in the terminal adaptor as well as in the ISDN standard terminal, the communication speed between the R reference point speed adjusting circuit and the time-sharing switch is limited to a fixed speed equal to or less than 32 kbps (32, 16, or 8 kbps) in the synchronous mode. Namely, the communication speed or rate of the user is therefore limited to the speed in the synchronous and asynchronous modes not exceeding the communication speed between the R reference point speed adjusting circuit and the time-sharing switch. As a result data items supplied at various communication speeds via a plurality of serial-transmission lines are adjusted through a time-sharing operation, thereby achieving communications at the speed of 64 kbps with the ISDN.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
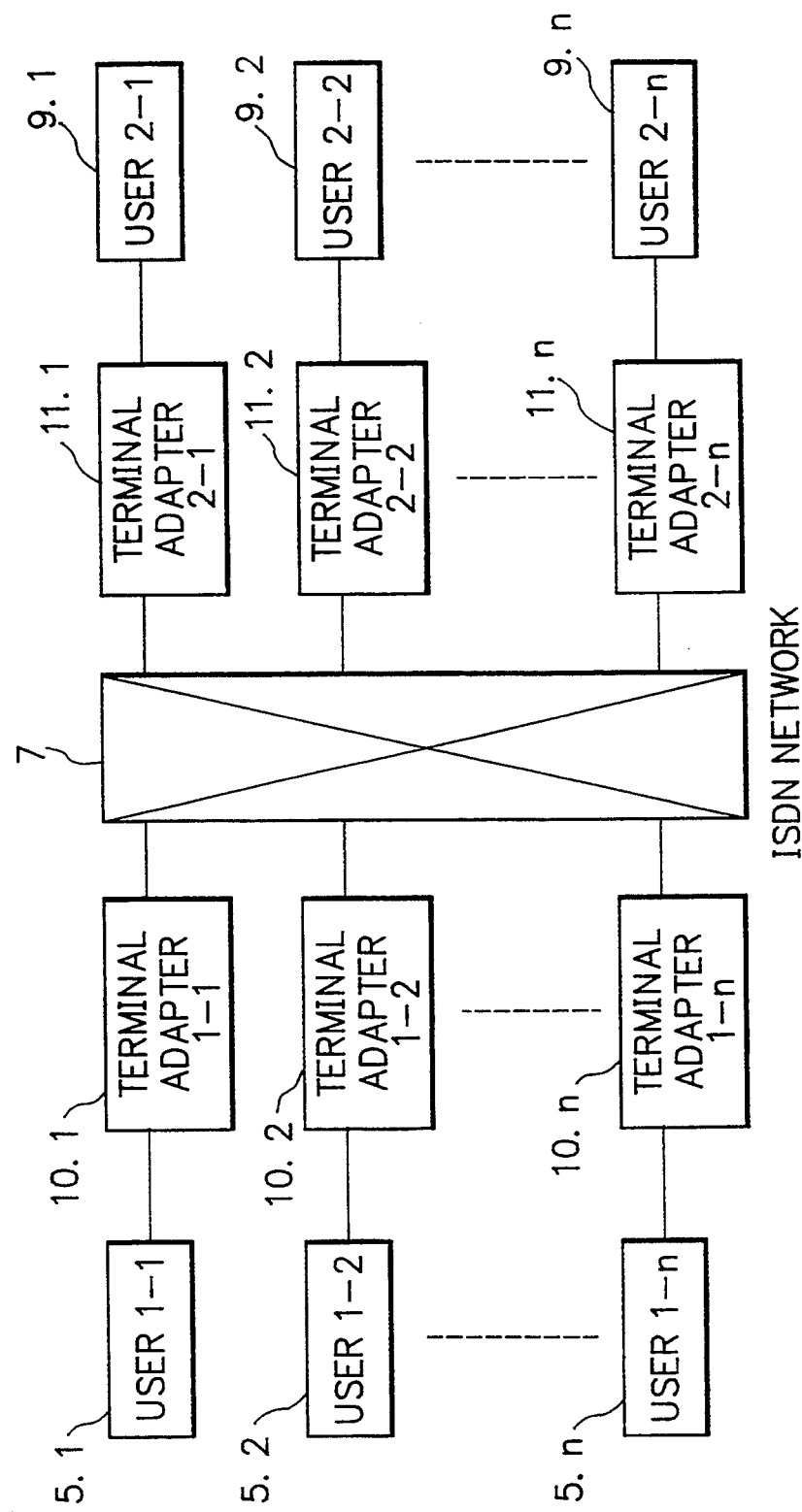
FIG. 1 is a schematic block diagram showing the utilization method of the communication speed converter of the prior art.

Referring now to the drawings, description will be given of an embodiment according to the present invention.

For easy understanding of the present invention, a communication speed converter of the prior art will be described. FIG. 1 shows an application example of the conventional speed converter conforming to the CCITT V.110 system. As can be seen from this diagram, non-ISDN terminals 5.1 to 5.n, CCITT V.110 speed converters 10.1 to 10.n operating according to the CCITT V.110 recommendation, comparable non-ISDN terminals 9.1 to 9.n, and comparable CCITT V.110 speed converters 11.1 to 11.n are connected to an ISDN 7. In a case where communications are accomplished through an exchange communication channel according to the V.110 recommendation as above, only one non-ISDN terminal can be connected to one V.110 speed converter.

Since the conventional speed converter accomplishes the speed adjustment according to bit mapping data, it is allowed to connect only one non-ISDN terminal to one communication channel. Even when communications are to be conducted at a low speed between the non-ISDN terminal and the speed converting facility, the communication speed of 64 kilo-bits per second (kbps) of the ISDN is employed for the communications and hence the density of mapping data is increased and unnecessary resources are disadvantageously required.

Figure 2:
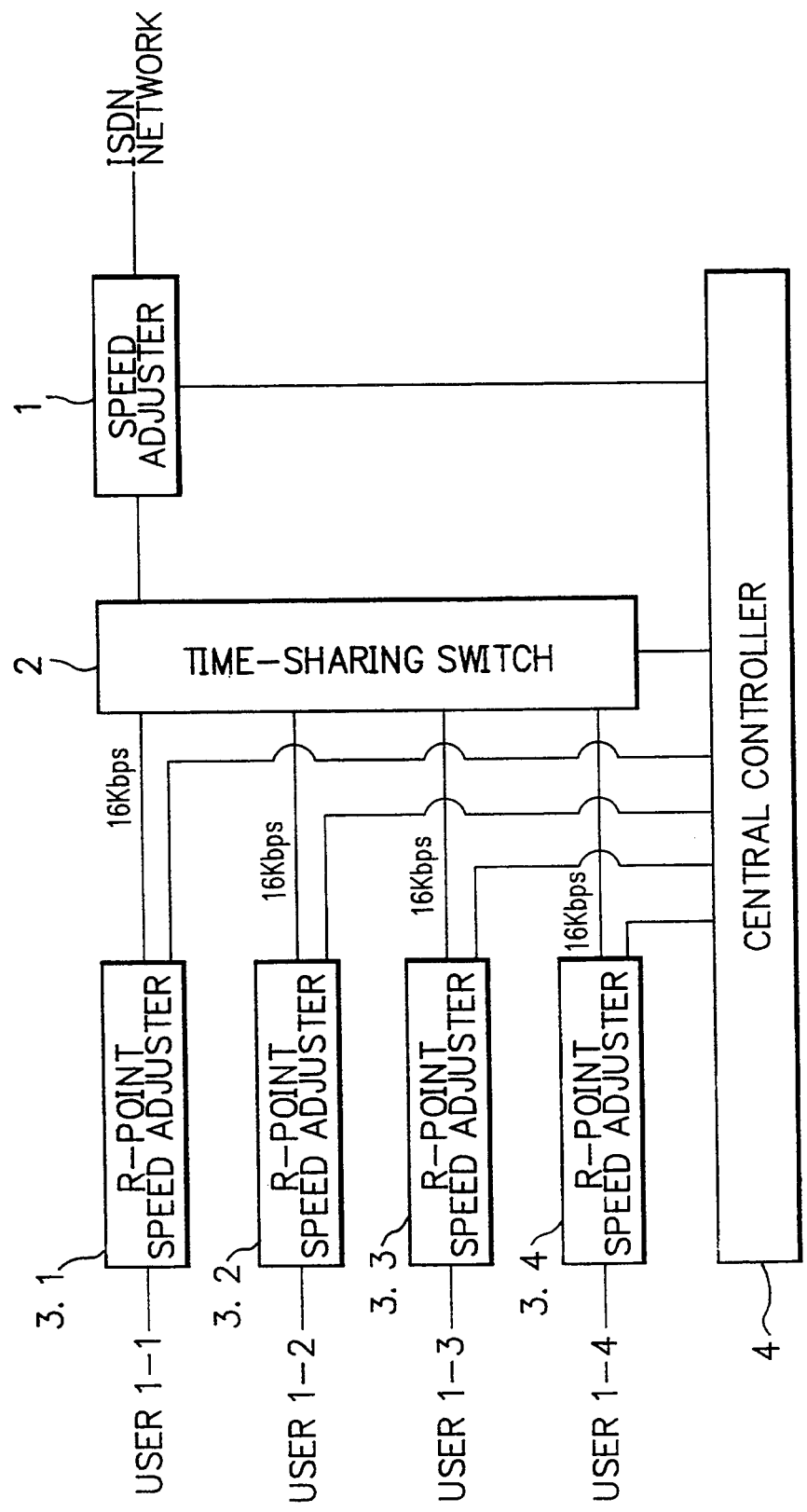
FIG. 2 is a block diagram showing an embodiment of the communication speed converter in accordance with the present invention.
Figure 3:
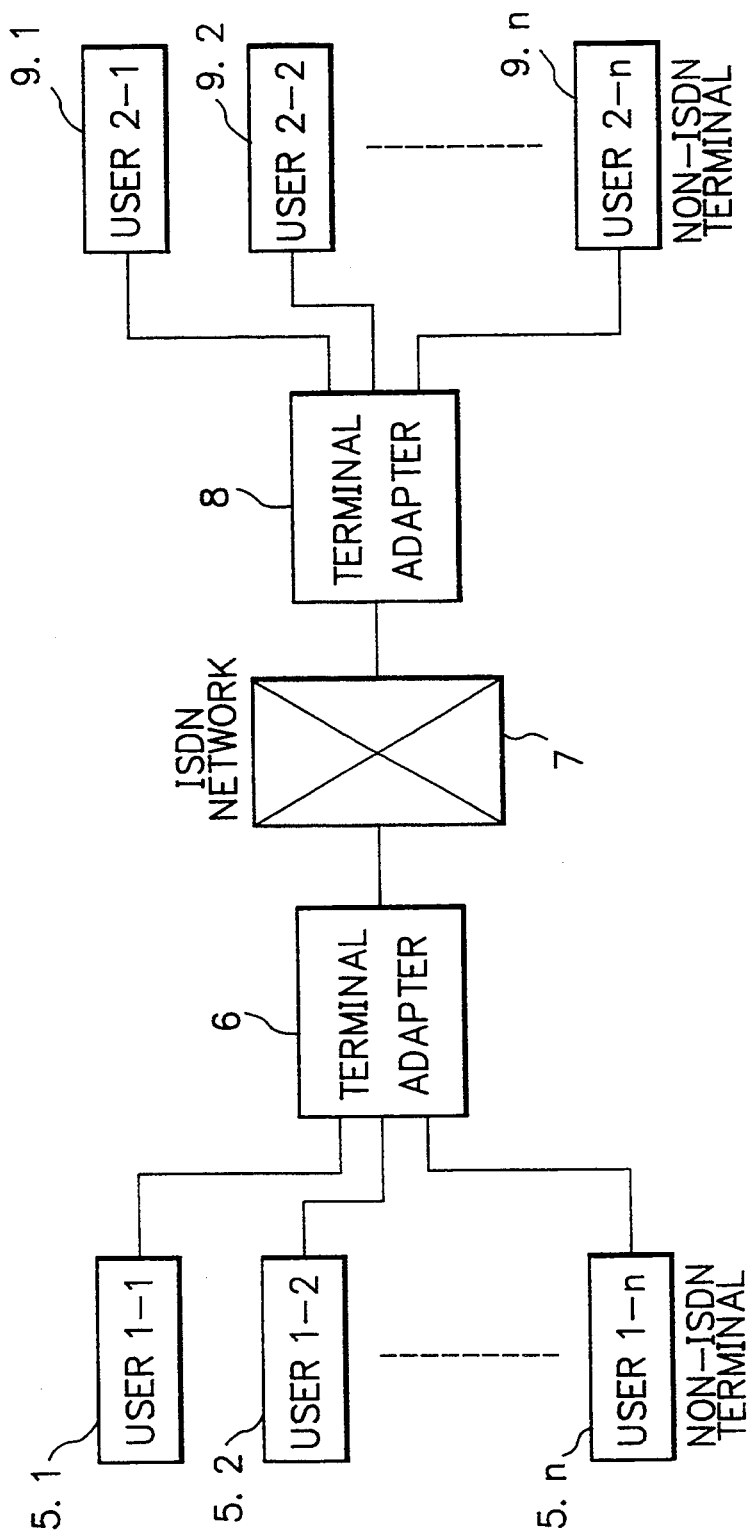
FIG. 3 is a block diagram schematically showing the utilization method of the communication speed converter according to the present invention.

FIG. 2 shows an embodiment of a multiple communication speed converter in accordance with the present invention and FIG. 3 shows the utilization method thereof.

As shown in this diagram, the configuration includes a communication speed adjusting circuit 1 conforming to the CCITT V.110 recommendation for a connection to the ISDN and a time-sharing switch 2 connected thereto. The switch 2 is linked with R reference point speed adjusters 3.1 to 3.4 each adjusting a communication speed or rate for the R reference point interface stipulated by the CCITT recommendations. The adjusting circuits 3.1 to 3.4 are coupled with R points respectively of users 1-1 to 1-4. There is further disposed a central control circuit 4 connected to the speed adjuster 1, the time-sharing switch 2, and the R reference point speed adjusting circuits 3.1 to 3.4 for controlling operations thereof.

Figure 6:
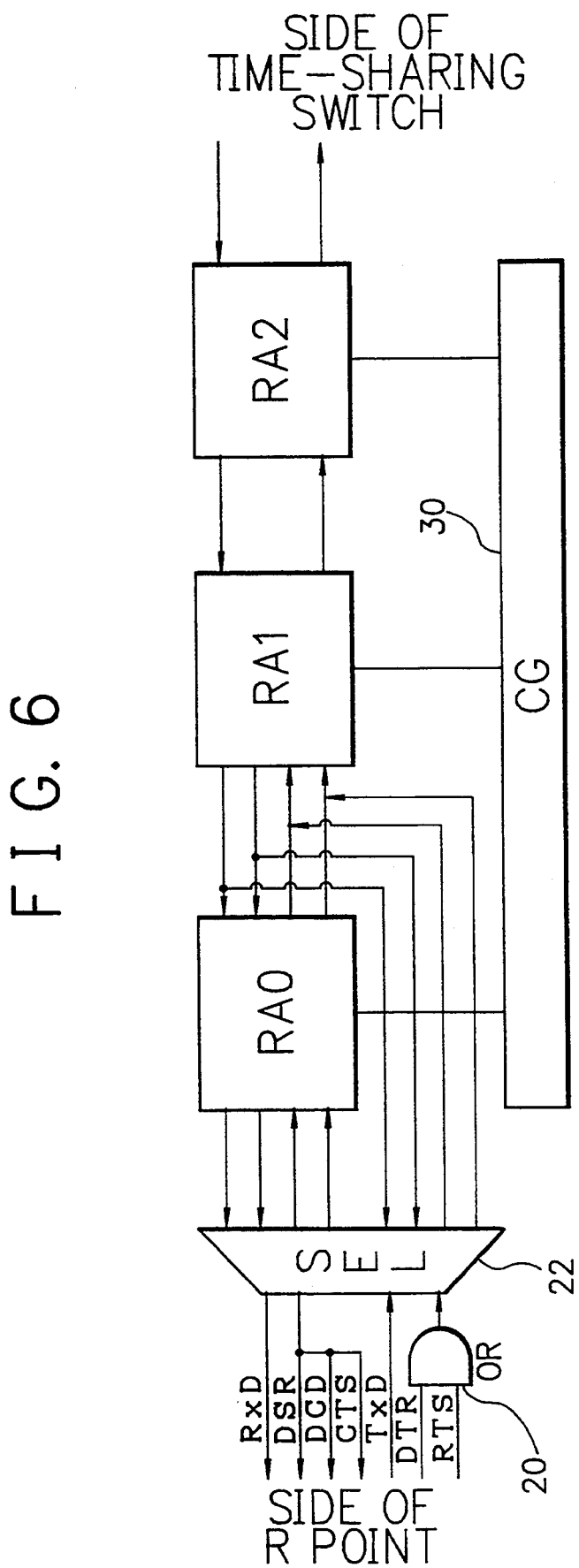
FIG. 6 is a block diagram showing the configuration of the R reference point speed adjusting circuit in the embodiment of FIG. 2.

FIG. 6 shows the configuration of each of the R reference point speed adjusters 3.1 to 3.4. As can be seen from the constitution, connected to the R reference point side via an interface circuit are a logical sum (OR) circuit 20 and a selector circuit 22. The OR circuit 20 delivers an output therefrom to the selector 22. A rate adaption unit 0 (RA0), which is to be abbreviated as a rate adaption 0, a rate adaption 1 (RA1), and a rate adaption 2 (RA2) are sequentially coupled with the selecting circuit 22. The rate adaption 2 is linked with the time-sharing switch 2. Moreover, the rate adaption 1 is connected to the selector 22. These rate adaption units RA0 to RA2 are linked with a clock generator circuit 30.

The OR circuit 20 produces a logical sum between a data terminal ready (DTR) signal and a transmission request (RTS) signal, which are contained in information delivered on signal lines from the user and which conform to the CCITT V-series recommendations, so as to resultantly output information to a signal line.

The selector 22 conducts a bus change-over operation of data and signal lines to the rate adaption 0 (RA0) or 1 (RA1) when the user interface is in the asynchronous or synchronous mode, respectively, thereby implementing the user interface for the communication line, transmission data (TxD), reception data (RxD), the transmission request (RTS) or data terminal ready (DTR), the data set ready (DSR) and data channel receiving carrier detection (DCD), and the transmission enabled (CTS) in conformity with the CCITT V-series recommendations.

When the user interface is in the asynchronous mode, the rate adaption O conducts a stop bit operation to achieve communications with the rate adaption 1 at a communication speed of $2^n \times 600$ bps (n=O, 1, 2, 3, 4, or 5).

The rate adaption 1 accomplishes a communication rate or speed adjustment for the interface speed of the rate adaption 0 or the user interface speed and as well as for a signal resultant from a logical sum produced by the OR circuit 20 between the data terminal ready (DTR) and transmission request (RTS) signals stipulated by the CCITT V-series recommendations to adapt these items to the communication speed of $2^k \times 8$ kbps (k=O, 1, or 2) in accordance with the V.110 speed adjusting method stipulated in the CCITT recommendations, thereby communicating the signals with the rate adaption 2.

The rate adaption 2 adjusts the interface speed of the rate adaption 1 to the communication speed of $2^k \times 8$ kbps (k=O, 1, or 2) to achieve signal communications with the time-sharing switch 2. However, when the interface speed for the rate adaption 1 is identical to that of the switch 2, the communication speed adjustment is not effected.

The clock generating circuit 30 generates and o supplies clock signals to the rate adaption units RA0 to RA2.

The operation of the apparatus shown in FIG. 2 will now be described.

When achieving communications according to the CCITT V.110 system, communication speeds respectively of R reference point speed adjusting circuits 3.1 to 3.4 and a time-sharing switch 2 are established by a central control circuit 4.

Figure 5:
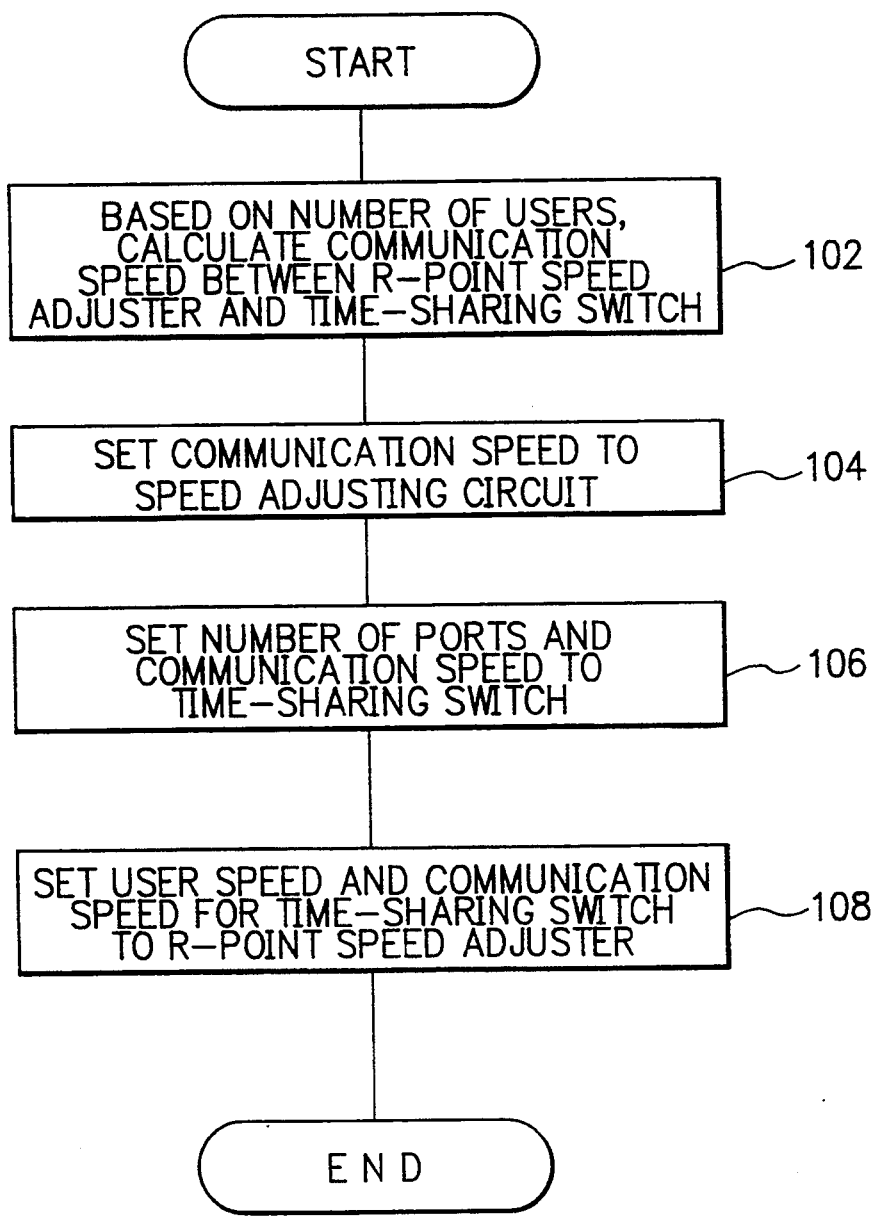
FIG. 5 is a flowchart showing the processing of the central control section of the embodiment in accordance with the present invention.

Referring to the flowchart of FIG. 5, the operation of the embodiment of FIG. 2 will be described.

First, in a step 102, the communication speed between each of the R reference point speed adjusters 3.1 to 3.4 and the time-sharing switch 2 is calculated according to the number of users. Since the switch 2 is connected to four adjusters 3.1 to 3.4 in this embodiment, the speed is computed as 64 kbps÷(the number of R reference point speed adjusters, namely, four) such that the obtained 16 kbps (in the synchronous mode) is set as a limitative communication speed therebetween.

Subsequently, the user speed, namely, the speed between the R reference point and the R reference point speed adjusting circuit is restricted to be lower than the speed between the speed adjusters 3.1 to 3.4 and the switch 2 (step 104).

Figure 4:
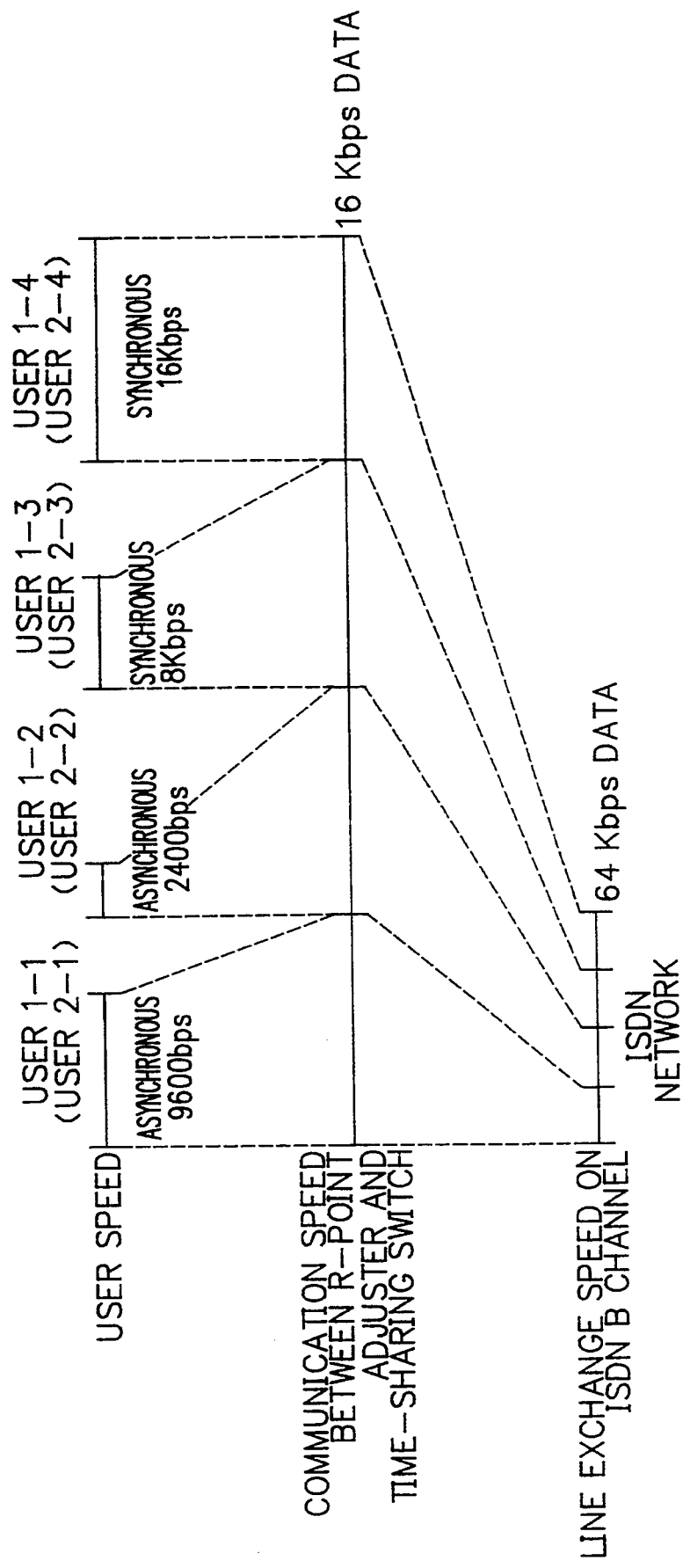
FIG. 4 is a diagram illustratively showing the operation of the apparatus of FIG. 2 for adjusting user data to the ISDN network.

FIG. 4 shows relationships between the communication speed between the R reference point speed adjusters 3.1 to 3.4 and the time-sharing switch 2, the user speeds, and the line exchange speed of the ISDN. In the example of this diagram, the line exchange speed of the ISDN is 64 kbps, the communication speed between each of the R reference point speed adjusters 3.1 to 3.4 and the time-sharing switch 2 is 16 kbps, the user speeds are 9600 bps, 2400 bps, 8 kbps, and 16 kbps for the users 1-1 to 1-4, respectively.

Returning now to FIG. 5, the number of ports to be connected to the switch 2 and the communication speed with respect to the speed adjuster 1 are set to the switch 2 (step 106). Moreover, the limitative user speed and the calculated communication speed obtained for the switch 2 are set to the speed adjusters 3.1 to 3.4 (step 108).

When transmitting signals, data are sent from the R point to the time-sharing switch 2 at the user speed determined by the related R reference point speed adjuster.

In the switch 2, data received from the four adjusters 3.1 to 3.4 at 16 kbps are arranged through a time-sharing operation into data associated with the 64 kbps communication speed, thereby transmitting the resultant data via the speed converter circuit 1 to the ISDN.

When receiving signals, the data received from the ISDN at 64 kbps are delivered via the speed adjuster circuit 1 to the switch 2.

In a method reverse to that used in the transmission, the 64 kbps data are subjected to a time-sharing operation in the switch 2 to be subdivided into four 16 kbps data items. The obtained data items are fed to the respective adjusters 3.1 to 3.4 to undergo therein a speed adjustment, thereby sending the resultant data at the user speed to the R point.

Thanks to the operations above, as shown in FIG. 3, a plurality of non-ISDN terminals 5.1 to 5.n and 9.1 to 9.n connected to the ISDN 7 via terminal adaptors 6 and 8 as speed converters can achieve bi-directional communications therebetween through a 64 kbps exchange channel.

Incidentally, in the apparatus above, the users of which attributes are determined in advance establish connections therebetween to achieve communications with each other at an identical speed between the R reference point speed adjusting circuits and the time-sharing switch. Furthermore, since the communication speeds between the adjusters 3.1 to 3.4 and the switch 2 are set to be $2^k \times 8$ kbps (k=0, 1, or 2), the number of users connected to the apparatus is expressed as $2^j$ (j=0, 1, or 2). In this case, when the number of users actually incorporated in the system is unequal to the value $2^j$ the value of $2^j$ is determined according to a condition (number of users $<2^j$), thereby deciding the communication speed between each speed adjuster and the switch 2. For the remaining user data associated with the remainder resultant from $2^j$—(number of users), a predetermined data item is supplied from each speed adjusting circuit at the speed thus determined.

Figure 7:
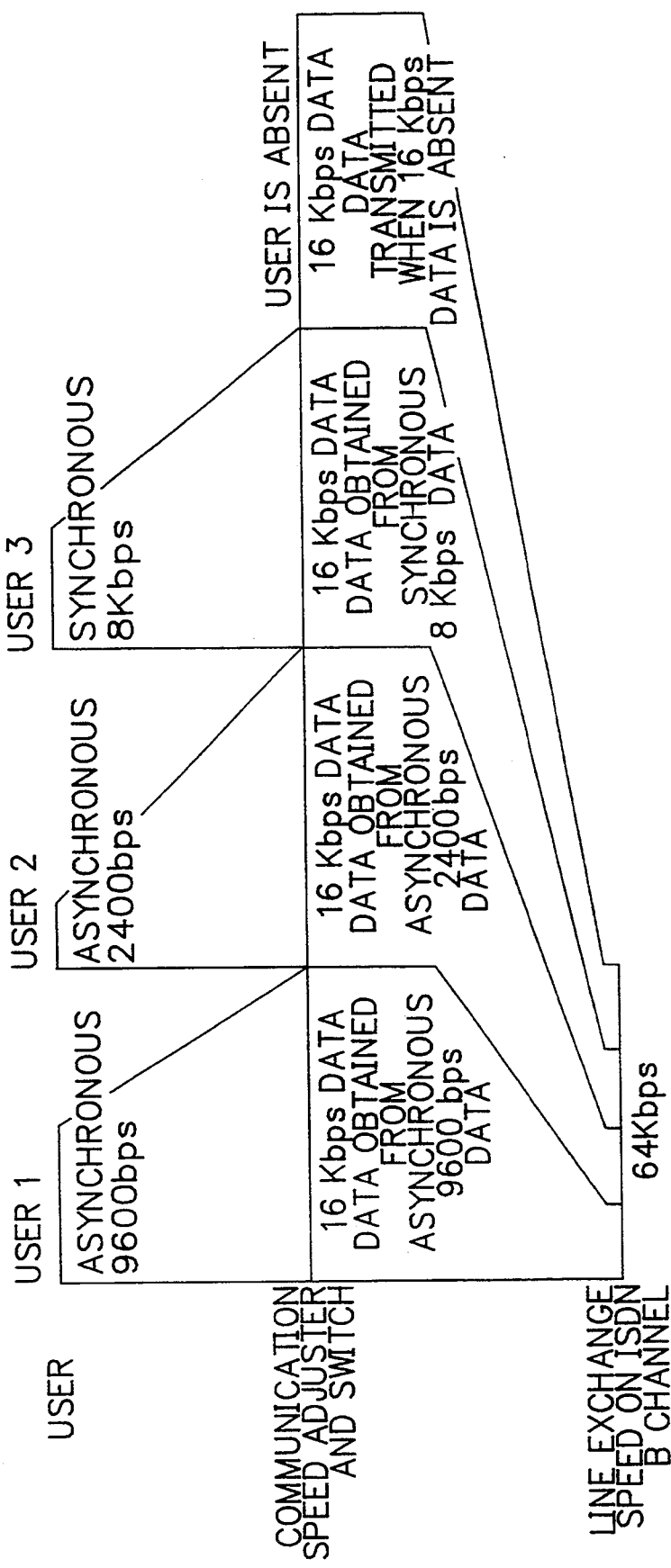
FIG. 7 is a diagram schematically showing the operation of the apparatus of FIG. 2 for adjusting the user data to the ISDN.

FIG. 7 shows an example of the system including three users. In this situation, the value j is determined as two according to the condition $3<2^j$. Consequently, the communication speed between the adjusters and the time-sharing switch is set as $2^k \times 8$ kbps (k=1)=16 kbps. As can be seen from the diagram, users 1 to 3 conduct communications with the R reference point speed adjusting circuits respectively associated therewith at communication speeds of 9600 bps, 2400 bps, and 8 kbps, respectively. For communication between the speed adjuster and the switch without any use, the data to be sent when the user is missing is transmitted.

As above, in accordance with the present invention, with provisions of the speed adjusting circuit, the time-sharing switch connected thereto, the R reference point speed adjusting circuits supplying data to the switch at a synchronizing speed, and the central control section controlling the operations of these circuits, a plurality of non-ISDN terminal can communicate with each other through a line exchange channel according to the V.110 speed adjusting procedure of the CCITT recommendations. As a result, this implements the multiplexing operations of terminals operating at various speeds according to the speed adjusting method in conformity with the CCITT V.110 system, which has been considered to be quite difficult theretofore. As a result, a financially advantageous effect can be attained and an efficient use of 64 kbps line exchange operation can be implemented.

While the present invention has been described with reference to the particular illustrative embodiment, it is not to be restricted by this embodiment but only by the appended claims. It is to be appreciated that those skilled in the art can change or modify the embodiment without departing from the scope and spirit of the present invention.

What is claimed is:

1. A multiple speed converting apparatus, comprising:
    speed adjusting means for achieving a speed adjustment in conformity with the V.110 of the CCITT recommendations;
    time-sharing switching means connected to the speed adjusting means for conducting a multiplexing operation in a time-sharing manner;
    a number of R reference point speed adjusting means connected to the time-sharing switching means and an R reference point interface stipulated according to the CCITT recommendations for supplying data to the switching means at a synchronizing speed; and
    control means responsive to the number of R reference point speed adjusting means for setting a communication speed between the switching means and the R reference point speed adjusting means to a fixed speed not exceeding 32 kbps, the fixed speed being associated with a synchronous mode;
    wherein the R reference point speed adjusting means includes:
    selecting means connected to the R reference point interface for achieving a change-over operation between signal lines according to a mode of a user interface;
    first rate adapting means connected to the selecting means;
    second rate adapting means connected to the first rate adapting means; and
    third rate adapting means connected to the second rate adapting means,
    the first rate adapting means achieving, when the user interface is in an asynchronous mode, communications with the second rate adapting means at a speed of $2^n \times 600$ bps (n=0, 1, 2, 3, 4, or 5),
    the second rate adapting means achieving communications with the third rate adapting means at a speed of $2^k \times 8$ kbps (n=0, 1, or 2).

2. An apparatus as claimed in claim 1, wherein the R reference point speed adjusting means further includes an OR gate for producing a logical sum between a data terminal ready signal and a transmission request signal sent from the user as signal information items and outputting the logical sum to the selecting means.

3. A multiple speed converting apparatus, comprising:
    a communication speed adjusting circuit conforming to the CCITT V.110 recommendations;
    a time-sharing switch connected to the communication speed adjusting circuit;
    a plurality of R reference point speed adjusters, connected to the time-sharing switch, adjusting a communication speed to an R reference point interface stipulated by the CCITT recommendations, based on a number of users of R reference point interfaces; and a central control circuit connected to the communication speed adjusting circuit, the time-sharing switch, and the plurality of R reference point speed adjusters, setting a communication speed between the time-sharing switch and the R reference point speed adjusters;

wherein the R reference point speed adjuster includes:

a logical OR gate, producing a sum signal of signal lines including a data terminal ready signal and a transmission request signal;

a selector, achieving a change-over operation between signal lines according to a user interface mode, connected to the sum signal and at least a portion of the signal lines;

a zeroth rate adaption; connected to the selector;

a first rate adaption, connected to the selector and the zeroth rate adaption; and a second rate adaption, connected to the first rate adaption.

4. An apparatus as claimed in claim 3, wherein the zeroth rate adaption achieves a first communication speed with the first rate adaption of $2^n \times 600$ bps (n=0, 1, 2, 3, 4, or 5).

5. An apparatus as claimed in claim 4, wherein the first rate adaption achieves a second communication speed with the second rate adaption of $2^k \times 8$ kbps (k=0, 1, or 2).

6. An apparatus as claimed in claim 5, wherein the second rate adaption adjusts a third communication speed to the time-sharing switch.

7. An apparatus as claimed in claim 3, further comprising a clock generating circuit generating and supplying a clock signal to the rate adaptions.

* * * * *